UNITED STATES PATENT OFFICE.

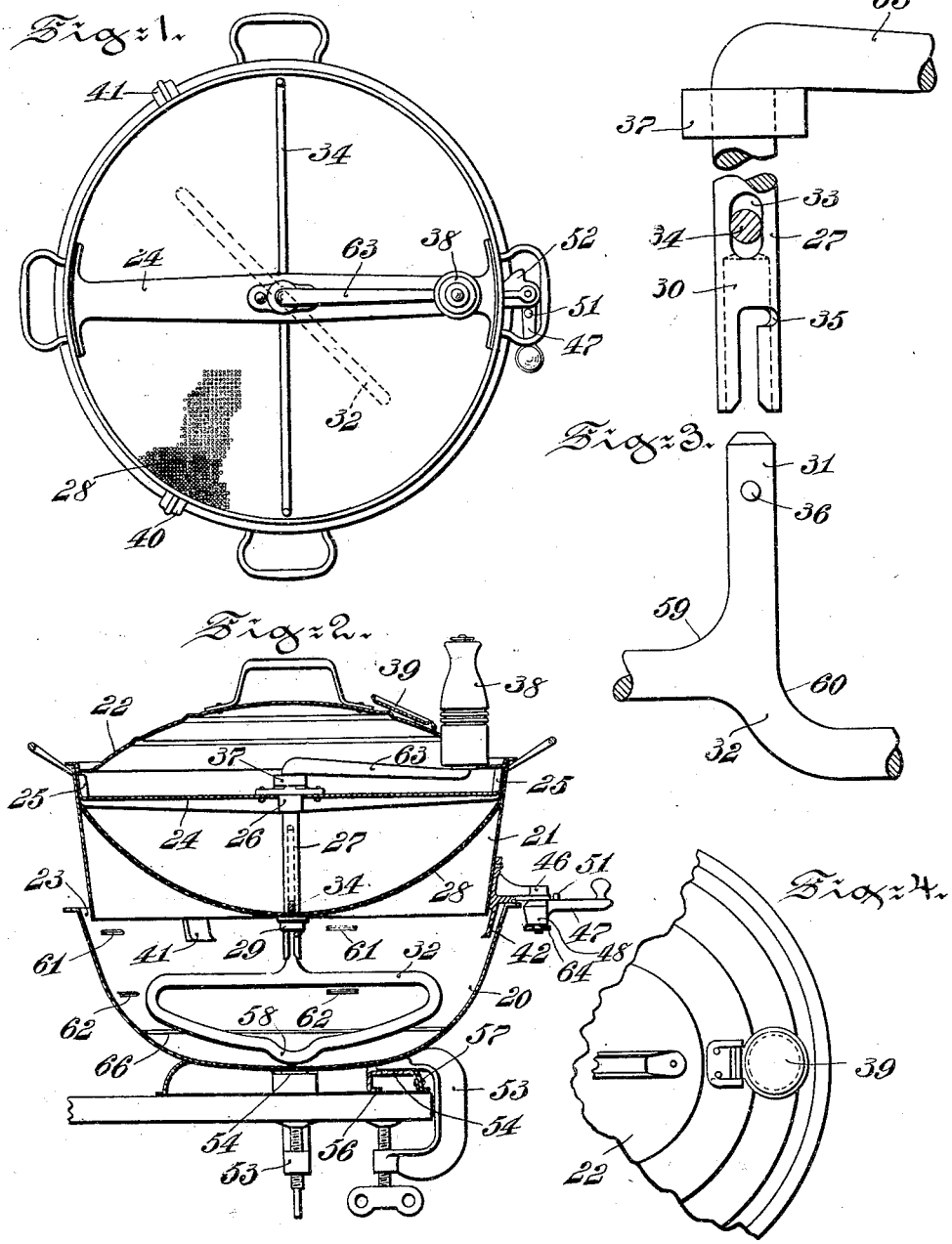

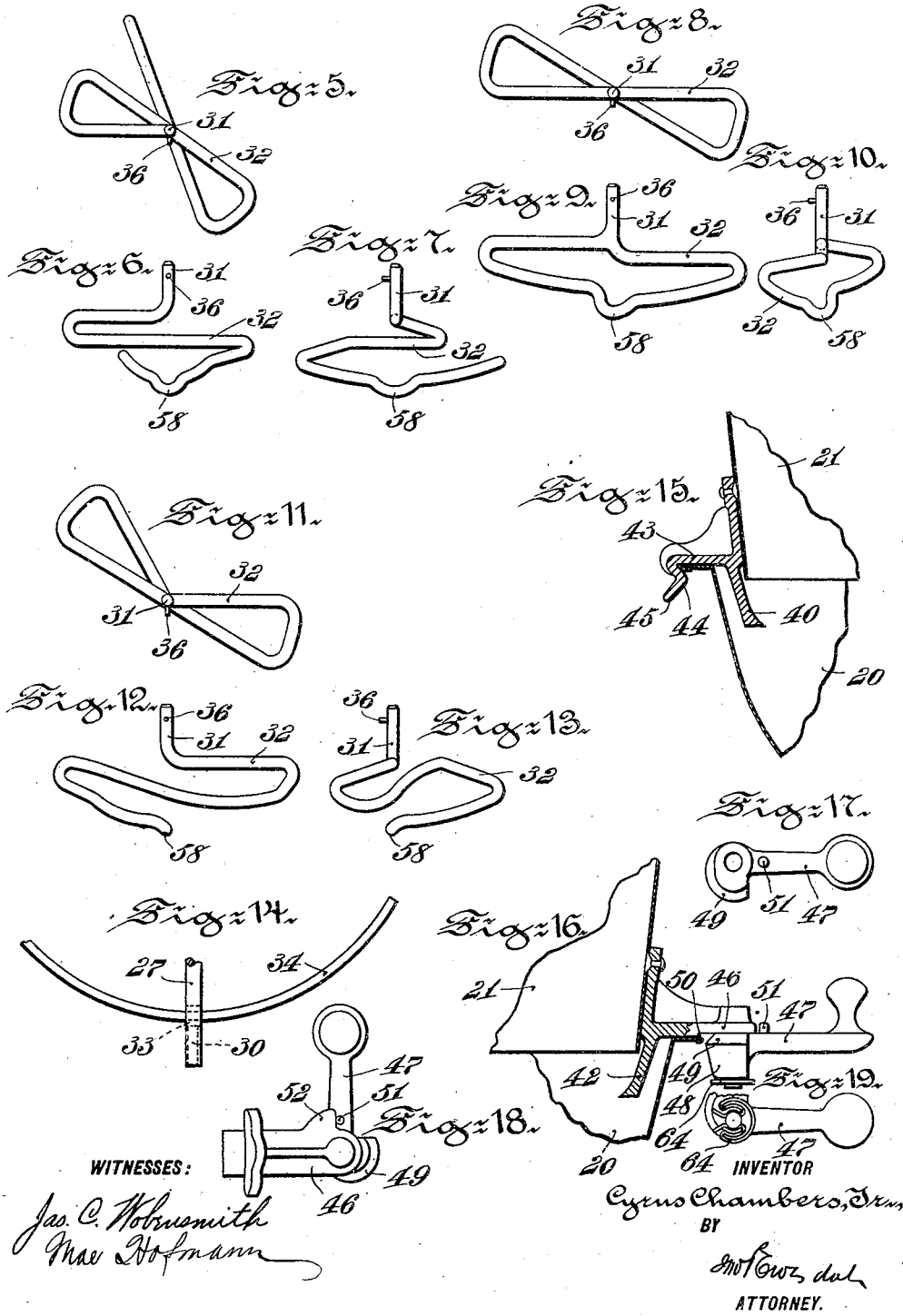

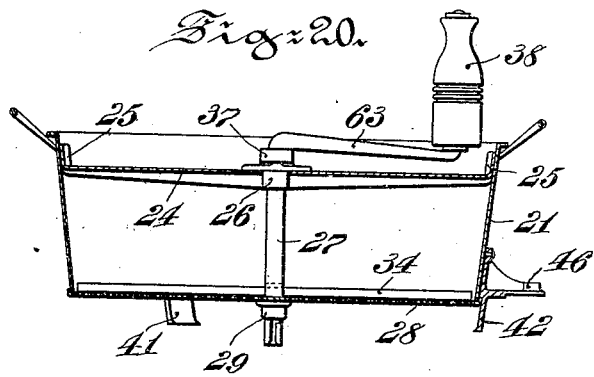
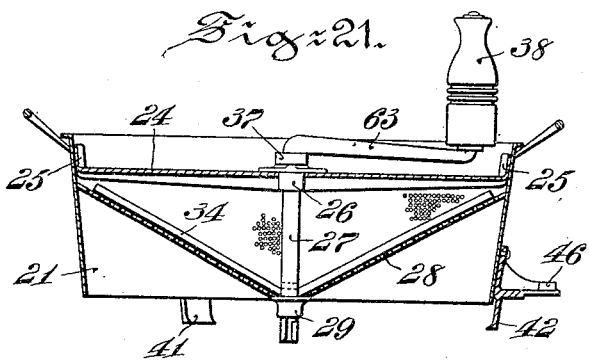
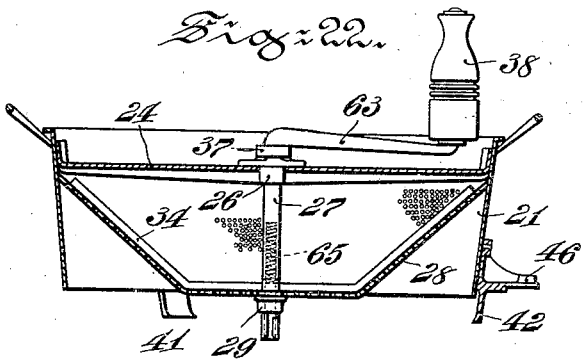

CYRUS CHAMBERS, JR., OF OVERBROOK, PENNSYLVANIA.

DOUGH-MIXING MACHINE.

No. 921,796.  Specification of Letters Patent.  Patented May 18, 1909.

Application filed October 24, 1906. Serial No. 340,279.

*To all whom it may concern:*

Be it known that I, CYRUS CHAMBERS, Jr., a citizen of the United States, residing at Overbrook, in the county of Montgomery and State of Pennsylvania, have invented a new and useful Dough-Mixing Machine, of which the following is a specification.

My invention relates to improvements in dough mixing machines.

The object of this invention is to provide improved means for mixing dough in the process of bread making and is especially adapted for family use, that is, for mixing dough in small quantities. For this purpose I have devised an apparatus simple and inexpensive in construction, requiring the minimum amount of space and being light and easy to handle.

Referring to the drawings:—Figure 1 is a plan view of my apparatus with the cover removed. Fig. 2 is a vertical cross-section of my apparatus complete. Fig. 3 is a fragmentary view in elevation of a portion of the winch, the vertical operating shaft and the mixing bar, the sifting bar is also shown in section. Fig. 4 is a fragmentary plan view of a portion of the cover with the lid closing the aperture through which the handle of the winch is adapted to protrude. Fig. 5 is a plan view of one form of mixing bar. Fig. 6 is a side elevation of same. Fig. 7 is an end elevation of same. Fig. 8 is a plan view of another form of the mixing bar. Fig. 9 is a side elevation of same. Fig. 10 is an end elevation of same. Fig. 11 is a plan view of another form of mixing bar. Fig. 12 is a side elevation of same. Fig. 13 is an end elevation of same. Fig. 14 is an enlarged view in elevation of a portion of the sifter bar and a portion of the shaft for operating the same. Fig. 15 is a fragmentary view in section of one of the feet of the sifter hopper and associated mechanism. Fig. 16 is a fragmentary view in section of another foot of the sifter hopper together with eccentric locking means connected therewith. Fig. 17 is a plan view of the eccentric locking means. Fig. 18 is a plan view of the locking eccentric and the supporting bracket therefor. Fig. 19 is an underside plan view of the locking eccentric showing the spring cotter for holding the same in position. Fig. 20 is a sectional view of the sifter hopper showing a modification of the sifting surface. Fig. 21 is a similar view showing a conical sifting surface. Fig. 22 is a similar view showing a sifting surface part conical and part flat.

Similar numerals refer to similar parts throughout the several views.

The basin or mixing chamber 20 is of form, shape and size as that commonly used for mixing and raising bread dough in the household and consists of a circular rounded bottom vessel with the upper edge turned out for stiffness and a circular flange on the outside of the bottom to make it stand steady on the table. This is all clearly shown in Fig. 2.

The sifter hopper 21 consists of a shallow tapering vessel whose upper edge is of the same diameter as that of the mixing basin 20 so that the cover 22 of the basin will fit the sifting hopper. The lower extension of the sifting hopper 21 is of a lesser diameter than that of the upper part of basin 20 so that the sifter hopper will project into the mixing basin and leave an annular space indicated by 23 between said sifter hopper and the upper edge of the mixing chamber for the circulation of the air.

Across and near the upper edge of the sifter hopper is provided the strut 24 formed of sheet metal bent down at its outer edges for stiffness and turned up at its ends to fit into the upper end of the sifter hopper, said turned up portions 25 being riveted to the walls of the sifter hopper. At the middle of this strut is located a box 26 through which the perpendicular shaft 27 projects and freely turns.

The sifter hopper 21 is provided with a perforated bottom 28 preferably in hemispherical form, which is secured at its upper edges to the surrounding walls of the hopper 21. This bottom 28 may be made of perforated metal or woven wire. It is to be understood that this perforated bottom while preferably concave as shown in Fig. 2, need not necessarily be made so but might be flat as shown in Fig. 20 or conical as shown in Fig. 21, or part conical and part flat as shown in Fig. 22. The sifting bar or agitator 34 is formed to correspond.

On the underside of the perforated bottom and at the center thereof is secured the box 29 through which the perpendicular shaft 27 extends into the mixing basin 20. In the perpendicular shaft 27 near its lower end is provided the slot 33 through which passes the curved or bent sifter rod or agitator 34, the relative dimensions of rod and aperture being such as to permit a slight upward and downward and also a rocking movement of said rod.

The lower end of the perpendicular shaft 27 is provided with an upwardly extending recess 30 adapted to receive the vertically extending portion 31 of the mixing bar 32. The relative proportions of recess and bar being such as to permit a free movement of the bar in the recess. The recess 35 is also provided in shaft 27 for coöperating with the pin 36 forming a lantern catch to lock the mixing bar 31 with shaft 27 when the winch is turned in the clock-wise direction and to unlock when the winch is turned in the counterclockwise direction as clearly shown in Fig. 3.

At the upper end of shaft 27, and immediately under the winch, is provided a collar 37 which is adapted to rest upon the upper side of box 26 and maintain the shaft at the proper elevation thus holding the weight of the shaft, the winch and their attachments together with the weight of the hand of the operator so that the shaft may not be forced down to cause a binding of the sifter bar and so that the sifter bar may lie by gravity upon the surface of the perforated bottom 28 and readily adapt itself to any inequalities thereof.

When it is desired to increase the pressure upon the sifting bar 34 to an extent beyond its own weight, I recess or bore out the perpendicular shaft 27 for the reception of the mixing bar to a depth beyond which the sifter bar passes through the perpendicular shaft, and insert therein above the sifting bar a spiral spring 65, as indicated in Fig. 22, its upper end resting against the bottom of the recess, and its lower end across the middle of the sifter bar, thus adding to the weight of the sifter bar whatever strain the spring may give.

The handle 38 of the winch is of perpendicular construction consisting of a portion of the same, say the lower half thereof cylindrical in form, while the upper half is necked in for convenient grasping by the hand. The said cylindrical part is so made as to protrude through an aperture in the slanting cover 22 and at the same time approximately fill said aperture to exclude air and dirt. The lid 39 is hinged to cover 22 and adapted to close this aperture when the cover is used on the mixing basin while the bread is rising. It will thus be seen that the concavo-convex cover 22 is adapted to fit upon the sifter hopper 21 and cover the winch and permit the handle to protrude, as shown in Fig. 2. This is the way the apparatus may be left when not in use. When it is desired to operate the apparatus the cover is removed altogether. When the dough is mixed and ready to be set aside to rise the same cover 22 is then placed upon the mixing vessel 20.

As above stated, the sifting bar 34 is curved to conform with the perforated bottom 28 of the sifter. This sifting bar passes through the elongated slot 33 of the operating shaft 27 and is adapted to rise and fall or rock to suit any inequality of the perforated bottom.

At three points about equal distances apart around the lower edge of the sifting hopper 21 are provided the foot members 40, 41 and 42. The downwardly extending portion of these foot members are inclined inwardly to form tapering guides for the convenient assembling of the sifter hopper with the mixing basin. These feet also serve to support the sifter hopper when separated from the mixing basin. These foot members are also provided with horizontal extensions 43 slightly above the lower edge of the sifter hopper projecting over the top rim of the mixing basin and adapted to rest thereon. At the outer end of the horizontal extensions of foot members 40 and 41 are provided the hooks 44 having a flaring end 45 for guiding the same over the rim of the basin. These foot members are provided with suitable flanges which are riveted to the sides of the sifter hopper as clearly shown in Figs. 15 and 16. The foot member 42 shown in Fig. 16 is provided with a horizontal extension 46 to which is pivoted the swinging eccentric 47 having the beveled surfaces 48 and 49. 48 serves to form a guide in assembling the sifter hopper with the mixing chamber while 49 being in an eccentric arc is adapted to engage the underside of the outer margin 50 of the rim of the mixing basin 20 and serves when the eccentric 47 is operated to lip under said rim and draw the hook portions 44 of the other two foot members under said rim of the mixing basin and thereby securely lock the sifter hopper to the mixing basin and in the required concentric position to maintain an air space between the sifter hopper and the mixing chamber.

The movement of the eccentric member 47 is limited in one direction by the engagement of pin 51, secured to said eccentric member 47, with the lug 52 on extension or bracket 46. So that when the eccentric member 47 is thrown all the way around into the position shown in Fig. 18 it is in the proper position for the assembling of the sifter hopper with the mixing basin. At one side of the outer rim of the mixing basin, forming the base thereof is made an opening through which the upper end of a screw clamp 53 enters into a pocket formed by sheet metal so as to present a level surface 54 for the underside of the upper end of the clamp. The two ends of the bottom thereof are turned down and extend in a line with the lower edge of said rim so that when the mixing basin is clamped to the table the turned down ends of the pocket rest thereon and prevent the clamp from bending the bottom of the mixing basin. The inner end of the bottom of this pocket which is turned down to the downward strain against the top of the table has its lower end bent horizontally to form a foot 56 to come against the top of the table and present considerable surface thereto. The said pocket member is secured to the underside of the bottom of the mixing basin and to the projecting rim thereof by rivets as indicated at 57 in Fig. 2. There may be two of these clamping recesses, and two clamps at right angles to each other, thus furnishing means for securing the mixing basin to the table both at the front edge and at the end of the table at the same time.

The mixing bar or member 32 is made of round iron of peculiar formation, three forms of which are shown in Figs. 5 to 13 inclusive. A peculiarity common to all forms of mixing bar or member is a central portion 31 standing perpendicular to enter the recess 30 of the shaft 27 and to be locked therein by the pin 36 and lantern catch 35. The general principle of the lower end of this mixing member is that it shall have a point, extension, or loop 58 projecting down at the center of rotation so that in the event of the winch being turned to the left and unlocking the lantern catch the mixing member cannot drop out of the sleeve 30 of the perpendicular shaft 27 nor the pin 36 get out of the perpendicular part of the lantern catch because the said point or loop 58 at the bottom of the mixing member comes in contact with the bottom of the mixing basin whereby the other portions of the mixing member are held away from the bottom of the mixing basin. Should this condition take place in the operation of the machine the portions of the mixing member on either side of the center of rotation are maintained elevated and away from the bottom of the mixing basin and the machine will perform all of its functions under these conditions. The general principle of this mixing member is that the portions on either side of the center of motion present the same resisting surface to the dough and thereby balance the strain on either side of the center of motion and thus relieve the perpendicular shaft of any material side strains. Another condition common to all the forms except that shown in the sectional elevation of Fig. 2 is that no two portions on opposite sides of the center of motion of said mixing member shall pass horizontally through the dough in the same plane or elevation. This results in each portion having a different path of movement.

In the form shown in Figs. 5 to 7 inclusive the mixing member is in the form of a loop that is, without any end projecting. The ends uniting with the perpendicular shaft being provided with large fillets as at 59 and 60, see Fig. 3 to prevent corners for lodgment of dough and to facilitate the cleaning thereof. The mixing members illustrated in Figs. 5 to 13 inclusive, are formed at their end bends, or bends at the largest diameter with extensions at an angle with the perpendicular portion thereof, so that when they revolve in the dough to the right or in the clockwise direction, they tend to lift the same up from the bottom of the mixing chamber, and to press it down when turned contrarywise. Another condition of the last preceding forms mentioned is that no two portions of these mixing members are perpendicularly over one another, except at the center of motion. The object of this being to allow them to move more freely through the dough and not require the dough to pass two bars at the same time; in other words the dough may be made to pass up over the leading bar and downward to pass under the succeeding bar, as will be clearly shown in the plan views of the same, thus making less tendency for the dough to revolve with the mixing member, but rather to secure the cutting of the mixing member through and through the dough, and thus produce a better mix and require less power in operating the machine.

Near the upper edge and on the inside of the basin 20 are arranged a series of horizontal visual marks 61. These marks are arranged around the basin all in the same horizontal plane and serve to indicate the level to which ten pounds of dough will rise when it reaches double its bulk. Below the marks 61 are provided another series of horizontal marks 62 similarly arranged for indicating the level of ten pounds of dough before it begins to rise, and also for indicating the level of five pounds of dough after the same has risen. Below the marks 62 is provided the continuous mark or line 66, extending horizontally entirely around the inner wall of the basin. This mark indicates the level of five pounds of dough before the same has risen. It is obvious that all of the marks 61, 62 and 66 may be either continuous or intermittent; the important feature being that each mark or series of marks shall appear at various points around the basin, in the same horizontal plane, in order to indicate when the dough is level. That is to say, the dough may be pressed level with these marks upon all sides of the rising vessel, and thus be made level, and better indicate the exact extent of the rising of the dough. This is important in large dough raising vessels.

The central shaft 27 with its winch 63 may be removed from its bearings and the sifter bar 34 removed from the sifter hopper by simply lifting up the shaft 27 until the sifter bar comes against the underside of the box 26 when the sifter bar 34 may be withdrawn from the aperture 33 in said shaft 27 and the shaft lifted out of the box 26, thus forming a ready means for taking the sifter apart.

Fig. 20 represents a sifter with a flat bottom, whereby the flour is sifted practically at a uniform speed.

Fig. 21 represents a sifter with a conical sifting surface, whereby the flour is sifted much more rapidly at the beginning of the operation, or while the hopper is full, than at the close, when the flour only occupies the apex of the inverted cone, and hence but little sifting surface is effective.

Fig. 22 represents a sifting surface represented by the surface of the frustum of a cone; that is to say, a sifting surface or vessel whose sides are conical and whose bottom is flat or plain. This device sifts the flour rapidly at the start, sifting throughout its conical sides and its flat bottom, and as the flour descends from the larger diameter of the conical portion the sifting becomes less and less rapid, so far as the action of the side is concerned, while the portion that is flat, or the flat bottom, continues to sift its full portion until all is through. Thus I am enabled to vary the proportions of flour sifted at the various stages of the process, as I may desire. The latter form of sifter is much more economically manufactured than the concavo-convex sifter, and, therefore, preferable.

The operation of my device is as follows:—
The requisite amount of liquid and the other ingredients going into the formation of dough, such as milk, yeast, lard, salt and sugar are placed in the mixing basin. The mixing member or bar is then hooked on to the perpendicular shaft 27 and the sifter is set in the mixing basin and locked thereto in the manner above described. The requisite amount of flour is placed in the sifter hopper; then, by turning the crank, motion is communicated to all the operative parts of the device, the sifter bar or agitator 34 sweeping the perforated bottom of the sifter hopper and the mixing bar rotating in the liquid in the mixing basin. The sifter hopper with its concave or hemispherical bottom sifting the flour throughout the whole surface thereof and thereby sifts the flour rapidly into the liquid of the mixing basin when it is thin so that the flour is readily saturated at the commencement of the operation. As the process continues and the flour lowers in the concave or hemispherical bottom of the sifter hopper there is gradually sifted less and less flour until all the flour is through. In this way the quantity of flour being delivered to the mixing basin is gradually diminished as the consistency of the dough becomes less and less liquid; that is to say, at first when the liquid is thin or the dough unformed, the flour is sifted rapidly, and as the dough thickens up and becomes less liquid and therefore not so readily mixed with the flour the quantity of flour is lessened to correspond approximately thereto, so that the feed of flour has a distinct proportional relation with the formation of the dough.

In order that the process adopted for manufacturing bread by this device may be carried out, the sifting surface should be of such proportions, relative to the capacity of the mixing basin, as to sift all the flour before the gluten is dissolved in the moisture and the dough becomes viscous. This time is practically one minute after the first flour is admitted to the liquid, therefore the whole process should be completed in one minute, unless it is desired to knead the dough after the flour is admitted, in which case the process may be continued a few seconds longer. When this is completed the winch is turned backward, or counterclockwise, which unlocks the lantern hook from the sifting device and the sifter may be lifted off the mixing basin by the unlocking of the eccentric clamp, leaving the mixing member in the basin. The dough is then scraped from the mixing member 32 and pressed down to a level, which, when making ten pounds of dough, will be level with the middle mark 62 in the mixing basin. And now the cover is put upon the mixing basin and the dough is set in a warm place to rise as is usual.

As the device herewith illustrated is designed to mix as much as ten pounds of dough at one time and when said dough rises to double its capacity when first mixed, it is then ready to be cut down, turned over, rekneaded, and placed in the pans for baking. The proper amount of expansion of the dough is indicated by the mark 61 inside of the basin near the upper edge thereof. The upper mark 61 represents the proper height for ten pounds to rise, and mark 62 represents the proper height for five pounds to rise. The said mark 62 also represents the height of ten pounds of dough before rising.

What I claim is:—

1. In a dough mixing machine, the combination of a mixing vessel, a superimposed sifter hopper, a sifter bar, a mixing member and a vertically disposed shaft for operating the sifter bar and mixing member.

2. In a dough mixing machine, the combination of a mixing vessel, a superimposed sifter hopper, a rotatable sifter bar and a rotatable mixing member, and a vertically disposed shaft for operating the rotatable parts.

3. In a dough mixing machine, the combination of a mixing vessel, a sifter hopper arranged above the mixing vessel, said hopper having its lower extension of less diameter than that of the upper extension of the mixing vessel, so as to project into said mixing vessel and leave an annular space between the walls of the hopper and the vessel for the circulation of air.

4. In a dough mixer, a mixing vessel, a sifter hopper arranged above the vessel, a vertical shaft projecting into the mixing vessel and a mixing member disengageably connected with the shaft.

5. In a dough mixer, a mixing vessel, a sifter hopper arranged above the vessel, a vertical shaft operating in the mixing vessel recessed at its lower extension, a mixing member having an extension vertically movable in the recess of the shaft and means for locking said extension with the shaft.

6. In a dough mixer, a mixing vessel, a sifter hopper arranged above the vessel, a shaft projecting into the vessel, a mixing member operating in said vessel, means for locking the mixing member with the shaft when the latter is rotated in the clockwise direction and means for causing the unlocking of the mixing member from the shaft when the latter is rotated in the counter-clockwise direction.

7. In a dough mixer, a mixing vessel, a sifter hopper arranged above the vessel, a mixing member in the vessel provided with a bend at the center of its rotation below the surrounding parts for engaging the smooth surface of the bottom of the vessel.

8. In a dough mixer, a mixing vessel, a sifter hopper, a vertical shaft operating in the sifter hopper and the mixing vessel, a sifter bar loosely seated in an elongated recess of the shaft to permit rocking and up and down movement.

9. In a dough mixer, a mixing vessel, a sifter hopper having a hemispherical perforated bottom, a sifter bar rotating on a vertical axis for sweeping said bottom, the parts being so arranged and operated that the amount of flour sifted at each rotation of the sifter bar will gradually decrease.

10. In a dough mixer, a mixing vessel, a sifter hopper arranged above the vessel, a mixing member in the vessel, comprising a single continuous extension or rod, a rotating element connected with one end thereof, said rod having a plurality of bends and extensions, one extension passing across the axis of its movement, the whole member so formed and disposed that the extensions will move through different planes at different heights to facilitate the thorough mixing of the dough.

11. In a dough mixer, a mixing vessel, a sifter hopper arranged above the vessel, a mixing member in the vessel extending in different planes, and so formed and disposed that its different extensions shall be so divided by the axis of its rotation that their resistance through the dough will be equal on either side of the center of motion.

12. In a dough mixer, a mixing vessel, a sifter hopper arranged above the vessel, a mixing member in the vessel extending in different planes, and so formed and disposed as to comprise extensions oblique to the perpendicular or line of rotation, so that when they are turned in one direction they will tend to lift the dough, and in the reverse direction to depress it.

13. In a dough mixer, the combination of a mixing vessel, a superimposed sifter hopper, a rotatable sifter member, a rotatable mixing member, a vertically disposed shaft for operating the said rotatable members, and a journal box in the sifter hopper for supporting the weight of the shaft.

14. In a dough mixer, the combination of a mixing vessel, a superimposed sifter hopper, a rotatable sifter member, a rotatable mixing member, a vertically disposed shaft for operating the said rotatable members, a strut permanently secured to the upper portion of the sifter hopper, and a journal box supported by the strut for supporting the weight of the shaft.

15. In a dough mixer, the combination of a mixing vessel, a superimposed sifter hopper, a winch-driven shaft projecting into the sifter hopper and mixing vessel, and a cover for the sifter hopper provided with an aperture for receiving the handle of the winch.

16. In a dough mixer, the combination of a mixing vessel, a superimposed sifter hopper, a winch driven shaft operating therein and a concavo-convex cover so formed as to receive and cover the winch and provided with an aperture for the protrusion of the handle thereof.

17. In a dough mixer, the combination of a mixing vessel, a superimposed sifter hopper, a rotative sifter member, a rotative mixer member, a shaft for operating and supporting the same, a winch for operating the shaft, a collar on said shaft, a central strut secured to the sifter hopper and a box supported thereby for coöperating with the collar to support the shaft and its various operated and operating mechanisms.

18. In a dough mixer, the combination of a mixing vessel, a superimposed sifter hopper, a shaft extending vertically in the mixing vessel and sifter hopper, provided with a slot near the bottom of the sifter hopper and a stirring bar loosely seated in said slot.

19. In a dough mixer, the combination of a mixing vessel, a superimposed sifter hopper provided with a perforated bottom having portions sloping from near the upper edge of the hopper downwardly toward the center thereof, a shaft operating in said sifter hopper provided with a transverse recess, and a sifter bar conforming to the vertical cross section of said perforated bottom, loosely seated in said recess.

20. In a dough mixer, the combination of a mixing vessel, a superimposed sifter hopper, a shaft operating in said vessel and sifter hopper having a centrally disposed longitudinal recess at its lower end, a mixing member having a vertical extension projecting into said recess of the shaft, and lantern hook means for disengageably connecting the shaft and mixing member.

21. In a dough mixer, the combination of a mixing vessel, a superimposed sifter hopper, having a diameter at its lower extension, less than the diameter of the mixing vessel, at its upper extension, to secure an annular air space between the outer walls of said two members for the circulation of air between the interior of the mixing vessel and the outside atmosphere.

22. In a dough mixer, the combination of a mixing vessel, a superimposed sifter hopper having a diameter, at its lower extension, less than the diameter of the mixing vessel, at its upper extension, to secure an annular air space between said two members, the sifter hopper provided with a plurality of substantially equidistant feet for supporting it when not on the mixing vessel.

23. In a dough mixer, the combination of a mixing vessel, a superimposed sifter hopper having a diameter, at its lower extension, less than the diameter of the mixing vessel, at its upper extension, to secure an annular air space between said two members, the sifter hopper provided with a plurality of substantially equidistant feet for supporting it when not on the mixing vessel, and also formed to guide the sifter hopper to the desired relative position when superimposing the mixing vessel, said feet provided with hooks for coöperating with the rim of the mixing vessel to lock said sifter and mixing basin together, and a rotative clamping member coöperating with said hooks for securing said sifter and mixing basin in the locked position.

24. In a dough mixing machine, the combination of a mixing vessel and a superimposed sifter hopper, a mixing vessel provided with a flange at its upper extension, the sifter hopper provided with downwardly projecting hooks for coöperating the said flange and a tapered eccentric for clamping said members in the locked position.

25. In a dough mixer, the combination of a mixing vessel, a rotative mixing member formed of a bar or extension having a plurality of bends, a rotative element connected with one end thereof, said bar having extensions and comprising a bend out of the line of its general direction adjacent thereto, at the center of motion and below the main body of said member, adapted to engage with the bottom of the mixing vessel, a pivotal support therefor.

26. In a dough mixer, the combination of a mixing vessel and a rotative mixing member operating therein, a projection formed on the inner wall of the chamber for indicating the height to which the dough shall rise.

27. In a dough mixer, the combination of a mixing vessel and a rotative mixing member adapted to operate therein and a visual mark on the inner wall of the vessel to indicate the height of the dough to be operated upon.

28. In a dough mixer, the combination of a mixing vessel, a rotative mixing member adapted to operate therein, and a visual mark on the inner wall of the vessel to indicate the height of the dough to be operated upon, and a visual mark on the inner wall of the mixing vessel for indicating the height to which the dough shall rise.

29. In a dough mixer, the combination of a mixing vessel, a rotative mixing member adapted to operate therein, a visual mark on the inner wall of the vessel to indicate the height of the dough to be operated upon, and the height to which the dough shall be allowed to rise.

30. In a dough mixing machine, the combination of a mixing basin having a continuous concavo base-forming rim, recessed to receive a clamp, and provided in said recess with a clamp-engaging extension, secured to the rim and extending horizontally therefrom, and then vertically to the plane of the lower margin of said rim, substantially as and for the purpose specified.

CYRUS CHAMBERS, Jr.

Witnesses:
 DAVID A. HAMMOND,
 FRANK S. WINDOLPH.